US011330101B2

(12) United States Patent
de la Garza Villarreal et al.

(10) Patent No.: US 11,330,101 B2
(45) Date of Patent: May 10, 2022

(54) MANAGING SPOOFED CALLS TO MOBILE DEVICES

(71) Applicant: Micron Technology, Inc., Boise, ID (US)

(72) Inventors: Elsie de la Garza Villarreal, Nampa, ID (US); Madison E. Wale, Boise, ID (US); Bhumika Chhabra, Boise, ID (US); Claudia A. Delaney, Garden City, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/880,783

(22) Filed: May 21, 2020

(65) Prior Publication Data

US 2021/0368043 A1    Nov. 25, 2021

(51) Int. Cl.
| | |
|---|---|
| *H04M 3/42* | (2006.01) |
| *H04M 3/436* | (2006.01) |
| *H04L 29/06* | (2006.01) |
| *H04M 7/00* | (2006.01) |

(Continued)

(52) U.S. Cl.
CPC ........ *H04M 3/436* (2013.01); *H04L 65/1006* (2013.01); *H04L 65/1079* (2013.01); *H04M 3/42059* (2013.01); *H04M 7/0078* (2013.01)

(58) Field of Classification Search
CPC ........... H04M 1/2757; H04M 1/27453; H04M 3/4931; H04M 1/575; H04M 1/2746; H04M 1/663; H04M 1/724; H04M 1/27457; H04M 1/2477; H04M 1/27467; H04M 1/2747; H04M 3/2218; H04L 51/28; H04L 51/12; H04L 61/1594; H04L 67/10; H04L 67/306; H04L 29/12198; H04L 67/18; H04L 67/22; H04L 63/12; H04L 67/303; H04L 12/66; H04L 12/189; H04L 12/1895; H04W 4/023; H04W 4/029; H04W 4/021; H04W 4/02; H04W 12/06; H04W 4/025; H04W 64/00; H04W 48/04; H04W 4/38; G06F 3/0482;

(Continued)

(56) References Cited

U.S. PATENT DOCUMENTS

| | | | | |
|---|---|---|---|---|
| 8,559,926 B1 * | 10/2013 | Zang | ................... | H04W 12/126 |
| | | | | 455/411 |
| 8,655,314 B1 * | 2/2014 | Zang | ................. | H04M 3/42348 |
| | | | | 455/411 |
| 9,699,660 B1 * | 7/2017 | Blatt | ................... | H04W 12/126 |

(Continued)

*Primary Examiner* — Kharye Pope
(74) *Attorney, Agent, or Firm* — Perkins Coie LLP

(57) ABSTRACT

Methods and apparatuses for managing spoofed calls to a mobile device are described, in which the mobile device receives a call transmitted over a cellular or mobile network. The call may include a set of information associated with the network, such as a geological location of a device that generated the call, a hardware device identifier corresponding to the device, an internet protocol (IP) address associated with the device, or a combination thereof. The mobile device may determine whether the call is spoofed or genuine based on the set of information. Subsequently, the mobile device may assist a user of the mobile device to manage the call, such as blocking the call from reaching the user, informing the user that the call is spoofed, facilitating the user to report the call as spoofed to an authority and/or a service provider of the network.

15 Claims, 5 Drawing Sheets

(51) Int. Cl.
*H04L 65/10* (2022.01)
*H04L 65/1076* (2022.01)

(58) Field of Classification Search
CPC .. G06F 3/04883; G06F 3/016; G06F 3/04842;
G06F 3/0488; G06F 3/04817
USPC .... 379/142.06, 210.02, 201.04, 201.07, 249;
370/352; 455/456.1, 456.3, 404
See application file for complete search history.

(56) References Cited

U.S. PATENT DOCUMENTS

| | | | | |
|---|---|---|---|---|
| 9,781,255 B1* | 10/2017 | Gailloux | | H04M 3/51 |
| 10,404,852 B1* | 9/2019 | Garg | | H04W 24/08 |
| 10,778,681 B1* | 9/2020 | Douglas | | H04L 63/1425 |
| 2006/0041622 A1* | 2/2006 | Qutub | | H04L 51/12 |
| | | | | 709/206 |
| 2007/0081648 A1* | 4/2007 | Abramson | | H04M 3/436 |
| | | | | 379/161 |
| 2007/0159979 A1* | 7/2007 | Butler | | H04L 43/18 |
| | | | | 370/244 |
| 2007/0283006 A1* | 12/2007 | Hong | | H04L 65/1079 |
| | | | | 709/224 |
| 2008/0159501 A1* | 7/2008 | Cai | | H04M 3/42059 |
| | | | | 379/142.05 |
| 2008/0181379 A1* | 7/2008 | Chow | | H04M 3/42059 |
| | | | | 379/142.05 |
| 2009/0282094 A1* | 11/2009 | Hawkins | | H04L 51/12 |
| | | | | 709/203 |
| 2011/0032870 A1* | 2/2011 | Kumar | | H04W 12/12 |
| | | | | 370/328 |
| 2011/0294478 A1* | 12/2011 | Trivi | | H04M 3/436 |
| | | | | 455/415 |
| 2014/0199975 A1* | 7/2014 | Lou | | H04L 63/101 |
| | | | | 455/414.1 |
| 2015/0121480 A1* | 4/2015 | Efrati | | H04L 63/1466 |
| | | | | 726/5 |
| 2015/0226858 A1* | 8/2015 | Lei | | H04K 3/90 |
| | | | | 342/357.59 |
| 2015/0373193 A1* | 12/2015 | Cook | | H04M 3/42068 |
| | | | | 455/406 |
| 2016/0066149 A1* | 3/2016 | Pahwa | | G06F 3/0488 |
| | | | | 455/456.3 |
| 2017/0064076 A1* | 3/2017 | Hayakawa | | H04M 3/436 |
| 2018/0343343 A1* | 11/2018 | Filart | | H04W 12/126 |
| 2020/0169874 A1* | 5/2020 | Wagner | | H04W 4/02 |
| 2020/0379122 A1* | 12/2020 | Tontiruttananon | | G01S 19/215 |

* cited by examiner

MANAGING SPOOFED CALLS TO MOBILE DEVICES

TECHNICAL FIELD

The present disclosure generally relates to mobile devices, and more particularly relates to managing spoofed calls to mobile devices.

BACKGROUND

Mobile devices (e.g., cellular phones) are widely deployed to connect users across geographic locations around the world. This connectivity, however, may permit third parties who do not have legitimate reasons to call the users (e.g., unwanted sales or promotion calls) and/or have nefarious intent to defraud the users (e.g., by tricking or falsely inducing the users to believe an urgent situation requires their immediate attention). In some cases, such third parties may emulate or otherwise fabricate various information (e.g., nicknames, phone numbers of the users' contact lists) to appear on the users' mobile device to make the users to answer their calls. It would be beneficial for the users if the mobile devices can identify such calls to protect the users and/or to help the users in managing such calls.

DETAILED DESCRIPTION

Figure 1:
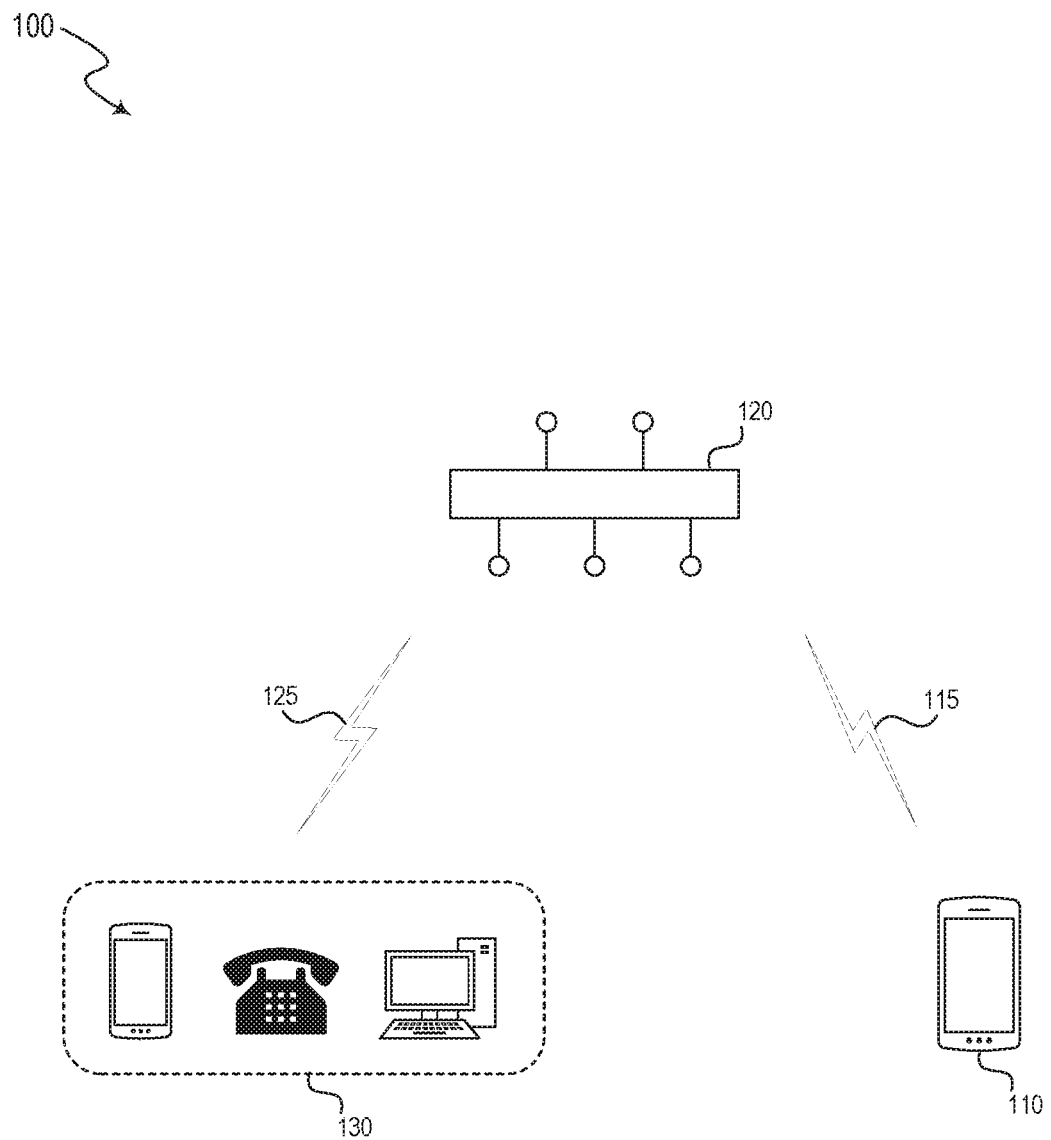
FIG. 1 schematically illustrates a communication system that supports managing spoofed calls to mobile devices in accordance with embodiments of the present technology.

Mobile devices (e.g., cellular phones) provide convenient means to connect users in various business and/or personal settings. The convenience of the mobile devices, however, may be mitigated by unwanted calls from third parties—e.g., to sell or promote their products, to defraud the users by presenting fake situations or by disguising themselves as legitimate entities (e.g., a mortgage bank, a credit card company) or a government agencies or authorities (e.g., a federal student loan agency, the Internal Revenue Service (IRS), the U.S. Department of Homeland Security). Such acts of concealing a true identity of a caller by disguising a phone call (or other forms of communication, such as an email or a text message) as a call from a trusted source may be referred to as spoofing.

In some cases, spoofed calls may be configured to display legitimate or authentic identifications (e.g., a mortgage bank, the IRS) as sources of the calls on the users' mobile devices to induce the users to answer the calls. In some cases, spoofed calls may use fake phone numbers (which may be referred to as spoofed phone numbers) as sources of the calls by mimicking trusted phone numbers (e.g., phone numbers of valid contact information stored in a mobile device), in which the fake phone numbers are generated by altering a few digits of the trusted phone numbers such that the fake phone numbers may appear only slightly different than the original phone numbers. Some users may be tricked by the similar appearances displayed on their mobile devices and answer the spoofed calls. In some cases, spoofed calls may be configured to display valid nicknames of the user's contact list to lower the user's alertness and trick the user to answer the spoofed calls.

Several embodiments of the present technology facilitate mobile devices to identify incoming spoofed calls based on various information associated with the spoofed calls such that the mobile devices can assist the users to manage the spoofed calls—e.g., blocking the spoofed calls from reaching the users, providing various notifications to assist the users in determining whether to answer potentially spoofed calls, prompting the users to report the spoofed calls to government authorities (or regulatory agencies) and/or service providers of the mobile devices. In some embodiments, a mobile device may receive a call transmitted over a wireless network (which may be referred to as a mobile network or a cellular network), where the call includes a set of information associated with the cellular or the mobile network, over which the call is transmitted. For example, the set of information may include a geographic location of a device that generated the call (a source device), which may be determined by a global positioning system (GPS), a hardware device identifier corresponding to the source device, an internet protocol (IP) address associated with the source device, or the like. Subsequently, the mobile device may determine whether the call is spoofed or genuine based on the set of information associated with the cellular or mobile network.

In some cases, the hardware device identifier may include an international mobile equipment identity (IMEI), an integrated circuit card identification (ICCID), a mobile equipment identifier (MEID), an international mobile subscriber identity (IMSI), or the like. For example, the mobile device may determine the IMEI of a source device of an incoming call matches with IMEIs of source devices associated with past spoofed calls that the mobile device has accumulated if the set of information includes IMEI. In this manner, if the set of information includes various forms of hardware device identifiers (e.g., IMEI, ICCID, MEID, IMSI), the mobile device may determine whether an incoming call is spoofed or genuine based on the set of information associated with the cellular or mobile network, over which the incoming call is transmitted.

For example, the mobile device may determine that the location of the source device is within a distance from one or more locations associated with spoofed calls that the mobile device has received prior to the call (i.e., the past spoofed calls). The distance (e.g., less than five (5) meters with 75% confidence level, less than ten (10) meters with 90% confidence level, etc.) may be devised to conclude that the location corresponds to the one or more locations associated with the past spoofed calls (e.g., within a range of error or error range) such that the mobile device can determine whether the call is spoofed or genuine. In other examples, the mobile device may determine that the hardware device identifier of the source device (e.g., IMEI, ICCID, MEIN, IMSI) corresponds to one of the hardware device identifiers associated with the past spoofed calls.

In yet another example, the mobile device may determine that the IP address of the source device includes a common segment with one or more IP addresses associated with the past spoofed calls. The common segment may be devised to conclude that the IP address of the source device corresponds to one of the IP addresses associated with the past spoof calls (e.g., with a range of error or error range)—e.g., fifty (50) or higher percentage of digits included in the IP address of the source device matches with one of the IP addresses associated with the past spoofed calls, where the digits of the IP address may be binary, decimal, or hexadecimal. In some cases, the mobile device may vary the common segment to use (e.g., dynamically determine) based on past history of mobile networks the mobile device has accumulated—e.g., some mobile networks may be more prone to generate spoofed calls than other mobile networks. In some cases, multiple phone numbers may be assigned (or otherwise generated) based on a single IP address. As such, the mobile device may be configured to efficiently block (or manage) multiple spoofed call having different phone numbers based on their IP addresses.

Similarly, the mobile device may determine that a media access control address (MAC address) associated the source device includes a commonality with one or more MAC addresses associated with the past spoofed calls. Typically, a MAC address may include forty-eight (48) binary bits (or six (6) groups of two hexadecimal digits). The commonality may be devised for the mobile device to determine that the MAC address of the source device corresponds to one of the MAC addresses associated with the past spoof calls (e.g., with a range of error or error range)—e.g., fifty (50) or higher percentage of binary digits (or hexadecimal digits) included in the MAC address of the source device matches with one of the MAC addresses associated with the past spoofed calls. In some cases, the mobile device may vary the commonality to use (e.g., dynamically determine) based on past history of mobile networks the mobile device has accumulated—e.g., some mobile networks may be more prone to generate spoofed calls than other mobile networks.

Further, the mobile device may provide, based on the determination, a user of the mobile device with one or more options to manage the call. For example, when the mobile device determines that the call is genuine (which may turn out to be a wrong determination based on an error range employed to make such determination), the mobile device may display a first option to prompt the user to answer the call, along with a phone number associated with the call in some cases. Further, the mobile device may add the phone number to a list of recent phone numbers received by the mobile device upon the user answering the call. Additionally or alternatively, when the mobile device determines that the call is spoofed (which may also turn out to be a wrong determination based on an error range employed to make such determination), the mobile device may display a second option to prompt the user to report the call (e.g., the phone number, the set of information associated with the network) to an authority (e.g., the Federal Communications Commission), a service provider of the cellular network (or the wireless network), or both. Further, upon the user selecting to report the call, the mobile device may add the phone number to a list of spoofed phone numbers stored in the mobile device. Similarly, the mobile device may store the set of information associated with the network in a memory of the mobile device, which is configured to store multiple sets of information associated with the network, over which the spoofed calls are transmitted.

In some embodiments, the mobile device may include a neural network component (and/or an artificial intelligence component) capable of training itself based on the user's past responses to potentially spoofed calls, which can be accumulated over time. In this manner, the range of error associated with determining that a call is spoofed (or genuine) may be improved (e.g., reduced). In some cases, the mobile device may, in conjunction with the neural network component (and/or the artificial intelligence component), estimate a confidence metric while determining that the call is spoofed—e.g., based on the set of information associated with the network, over which the call is transmitted. When the confidence metric associated with the determination is less than a threshold, the mobile device may display a notification on its screen informing the user that the call may be genuine (or spoofed). Subsequently, the mobile device may wait for the user making a response—e.g., answering the call, ignoring the call, reporting the phone number to an authority, etc. As such, the mobile device may be regarded as operating in a supervised mode. On the contrary, when the confidence metric is greater than the threshold, the mobile device may spontaneously block the call (and informing the user of such determination and blocking the call) or display another notification informing the user that the call is spoofed. As such, the mobile device may be regarded as operating in an unsupervised mode.

A wireless communication system that supports managing spoofed calls to mobile devices in accordance with embodiments of the present technology is shown in FIG. 1. Example screens of a mobile device in accordance with embodiments of the present technology are described with reference to FIG. 2. Detailed descriptions of the mobile device that supports managing spoofed calls are provided with reference to FIG. 3. Flowcharts illustrating methods of managing spoofed calls to mobile devices in accordance with embodiments of the present technology are described with reference to FIGS. 4 and 5.

FIG. 1 schematically illustrates a communication network diagram 100 that supports managing spoofed calls in accordance with embodiments of the present technology. The diagram 100 includes a mobile device 110 (which may be referred to as a user equipment, such as a cellular phone, a handheld device, a personal electronic device, etc.), a wireless communication link 115, an intermediary communication system 120, a communication channel 125, and a source device 130. The wireless communication link 115 couples the mobile device 110 with the intermediary communication system 120, facilitating downlink (DL) transmissions (from the intermediary communication system 120 to the mobile device 110) and uplink (UL) transmissions (from the mobile device 110 to the intermediary communication system 120). In some embodiments, the mobile device 110, the wireless communication link 115, and the intermediary communication system 120 may be collectively referred to as a cellular network, a wireless network, or a mobile network. For example, the intermediary communication system 120 may include a base station coupled with a core network, which supports the cellular network. In other examples, the intermediary communication system 120 may include a wireless access point that couples one or more Wi-Fi devices (including the mobile device 110) with a wired network—e.g., a voice over internet protocol (IP) telephone system.

The source device 130 may be coupled with the intermediary communication system 120 via the communication channel 125 that may be wireless or wired. For example, the source device 130 may be another mobile device (e.g., the user equipment) coupled with the intermediary communication system 120 via the communication channel 125 (e.g., a wireless communication link). In other examples, the source device 130 may be an electronic equipment (e.g., a phone, a computer configured to make numerous calls within a short period of time) connected to the intermediary communication system 120 via the communication channel 125 (e.g., a landline, a cable, or a combination of wired and wireless connection including a Wi-Fi access point). In some embodiments, the intermediary communication system 120 may collect various information regarding the source device 130, such as a geographical location of the source device 130, an IP address (or MAC address) of the source device 130, a hardware device identifier of the source device 130 (e.g., IMEI, ICCID, MEIN, IMSI), or the like. In some cases, the geographical location may be determined by a global positioning system (GPS). Further, the intermediary communication system 120 may include such information regarding the source device 130 in a DL transmission to the mobile device 110 over the wireless communication link 115—e.g., a phone call to the mobile device 110.

As such, the mobile device 110 may receive a call transmitted over the wireless communication link 115, which includes a set of information associated with the cellular or mobile network, which includes information regarding the source device 130—i.e., the set of information associated with the network may include various information regarding the source device 130. The mobile device 110 may determine whether the call is spoofed or genuine based, at least in part, on the set of information included in the call (or the set of information received along with the call or otherwise associated with the call). For example, the mobile device 110 may include a memory that stores a list of phone numbers associated with spoofed calls that the mobile device 110 has received (e.g., past spoofed calls). Further, the memory may be configured to store multiple sets of information included in the past spoofed calls (e.g., geographic locations of the source devices associated with the past spoofed calls, hardware device identifiers of the source devices that generated the past spoofed calls, IP addresses of the source devices that generated the past spoofed calls). In some embodiments, the mobile device 110 may compare the hardware device identifier of the source device 130 with the list of the hardware device identifiers of the source devices that generated the past spoofed calls. Subsequently, the mobile device 110 may determine that one of the hardware device identifiers stored in the memory matches with the hardware device identifier of the call—i.e., the call is spoofed despite the call may be displaying a legitimate phone number (e.g., one of the phone numbers in the user's contact list).

In some embodiments, the mobile device 110 may compare the geographic location of the source device 130 with the geographic locations of the source devices associated with the past spoofed calls. Subsequently, the mobile device 110 may determine that one of the geographic locations corresponds with the geographic location associated with the call (e.g., the geographic location is within a distance from the one or more geographic locations associated with the past spoofed calls)—i.e., the call is spoofed despite the call may be displaying a legitimate phone number (e.g., one of the phone numbers in the user's contact list). Such a distance may be devised to conclude that the geographic location corresponds to the one or more geographic locations within a certain error range. The error range may depend on various factors, such as accuracy of a global positioning system (GPS) that determines the geographic location of the source device 130 and/or the locations of other source devices that generated the past spoofed calls, uncertainties associated with determining a geographic location the source device 130 that may be a mobile device, or the like.

In some embodiments, the mobile device 110 may compare the IP address of the source device 130 with the IP addresses of the source devices that generated the past spoofed calls. Subsequently, the mobile device 110 may determine that one of the IP addresses of the source devices corresponds to the IP address of the call—i.e., the call is spoofed despite the call may be displaying a legitimate phone number (e.g., one of the phone numbers in the user's contact list). In some cases, the mobile device 110 may determine that the IP address of the source device 130 shares a common segment with one of the IP addresses associated with the past spoofed calls. In some cases, the common segment may be devised to conclude that the IP address corresponds to the one or more IP addresses associated with the past spoofed calls—e.g., fifty (50) or higher percentage of digits are included in both the IP address and the one or more IP addresses associated with the past spoofed calls within a certain error range. The digits may be binary, decimal, or hexadecimal based on construction format of the IP addresses. The error range may depend on various factors, such as the percentage of digits used (e.g., 50%, 60%, 70%, or even higher), information contained in the IP addresses (e.g., a region, city, and/or town of the source devices), or the like.

In some embodiments, the mobile device 110 may include a neural network component that can learn (and/or infer) from the user's input (e.g., a user of the mobile device 110) in response to receiving potentially spoofed calls. Such a neural network component may be configured to train itself based on the user's past responses accumulated over time. When trained sufficiently, the mobile device 110 may spontaneously determine which calls to identify and/or block as spoofed calls, without the user's input as to how to manage the calls identified as spoofed. When the neural network component requires more training, the mobile device 110 may, in conjunction with the neural network component, assist the user to determine whether to answer the calls or not. In some cases, the neural network component may include an artificial intelligence engine or algorithm configured to perceive certain patterns (or anomalies) in the spoofed calls (and/or in the sets of information included in the spoofed calls) such that the mobile device 110 may, in conjunction with the neural network component, increase a confidence level in identifying and/or determining certain calls as spoofed—e.g., reducing a range of error associated with such identification and/or determination.

Figure 2:
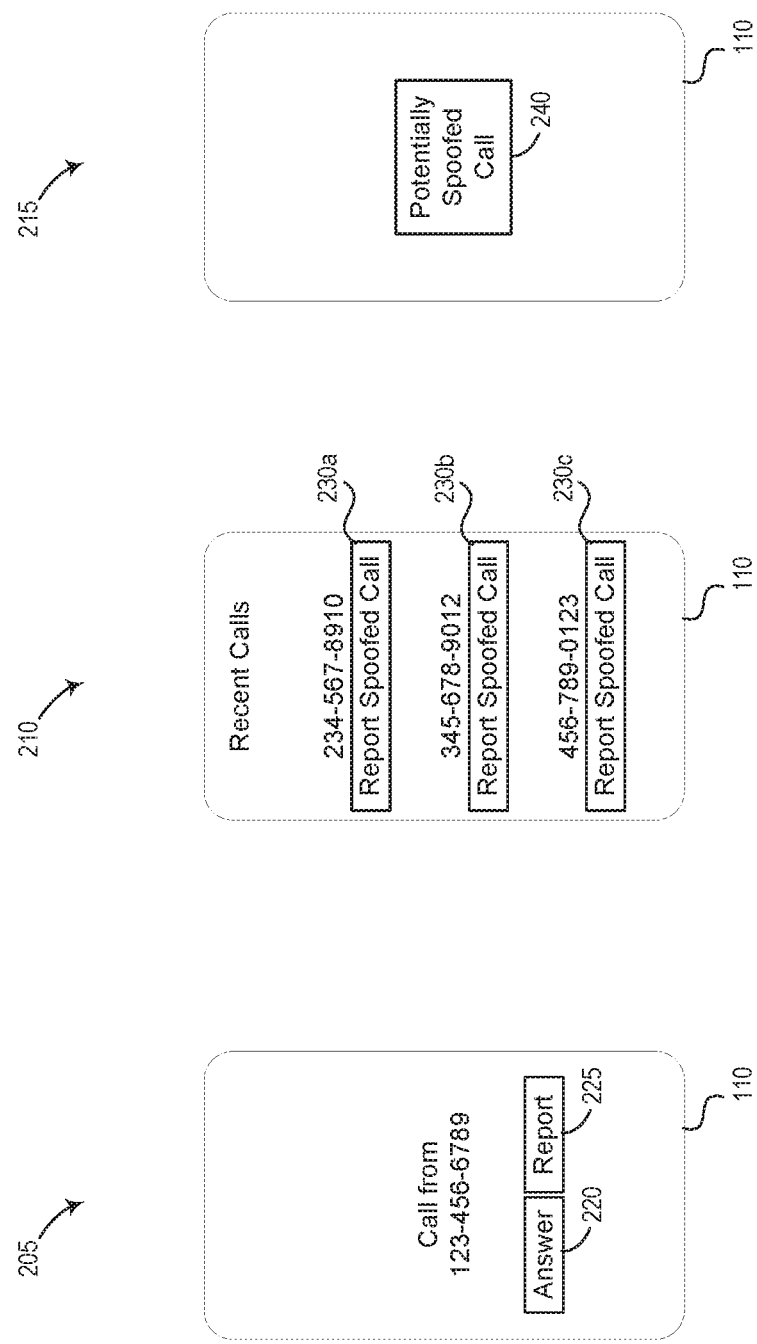
FIG. 2 illustrates example screens of a mobile device that supports managing spoofed calls in accordance with embodiments of the present technology.

In some embodiments, the mobile device 110 may estimate a confidence metric, in conjunction with a neural network component included in the mobile device 110 in some cases, while determining that a call that the mobile device 110 received is spoofed (or genuine) based on a set of information included in the call. The mobile device 110 may inform the user that the call is a spoofed call (and block the call) when the confidence metric is greater than a threshold. In this regard, the mobile device 110 operates in an unsupervised mode in which the mobile device 110 operates to spontaneously identifying the call as spoofed and blocking the call from reaching the user without the user's input (or response). In other cases, the mobile device 110 may determine that the estimated confidence metric is less than a threshold. In such cases, the mobile device 110 may display options for the user to select (e.g., answering the call, reporting the call as a spoofed call, ignoring the call), as well as a notification to the user informing that the call may be spoofed (or genuine). In this regard, the mobile device 110 operates in a supervised mode in which the mobile device 110 operates in accordance with a response (or input) from the user, FIG. 2 illustrates example screens of a mobile device that supports managing spoofed calls in accordance with embodiments of the present technology. As described with reference to FIG. 1, the mobile device (e.g., the mobile device 110) may determine whether a call is spoofed or genuine based, at least in part, on a set of information included in the call. Further, the mobile device may display one or more options and/or notifications for a user of the mobile device to manage the call. In some embodiments, the options may include answering the call, dismissing (e.g., rejecting, ignoring, silencing, terminating without answering) the call, sending the information about the call (e.g., a set of cellular information associated with the call) to a third party (e.g., a government authority, a service provider of the cellular network). Various aspects of managing spoofed calls are described below with reference to example screens of a mobile device in accordance with embodiments of the present technology.

As depicted in a first screen 205, the mobile device 110 may display, on its screen, a phone number corresponding to the call, a first input region 220, and a second input region 225. The first input region 220 may be configured to accept the user's input to answer the call. The second input region 225 may be configured to accept the user's input to report the phone number and the set of information included in the call to an authority (e.g., the Federal Communications Commission (FCC), State Consumer Protection Offices), a service provider of the cellular network (or the wireless network) over which the call is transmitted, or both. When the user selects the second input region 225, the mobile device 110 transmits the phone number and/or the set of information to the authority and/or the service provider. Further, the mobile device 110 may add the phone number to a list of spoofed phone numbers stored therein, after transmitting the phone number and the set of information. Additionally or alternatively, the mobile device 110 may store the set of information in a memory of the mobile device 110 configured to store multiple sets of information associated with spoofed phone numbers (i.e., spoofed calls), after transmitting the phone number and the set of cellular information.

In some cases, the authority may determine to take certain corrective actions (e.g., assessing fines to individuals or entities that generated the spoofed calls) based on the list of spoofed phone numbers and/or the sets of information (e.g., GPS locations, hardware device identifiers, IP addresses) reported to be associated with (or included in) the spoofed calls. Also, the service provider may provide warnings to its subscribers based on the list of spoofed phone numbers and/or the sets of information included in the spoofed calls when potentially spoofed calls are transmitted to the subscribers—e.g., calls generated using the spoofed phone numbers, calls associated with the GPS locations, the hardware device identifiers, and/or the IP address (or the MAC address), those which have been reported by the users (subscribers) as associated with (or included in) the spoofed calls. In some cases, the service provider may block the suspicious calls (e.g., spoofed calls) from reaching the subscribers.

Further, the first screen 205 may include an additional option for the user (not depicted in the first screen 205). For example, the first screen 205 may include an option to ignore the call (or relay the call to a voice message application of the mobile device 110)—i.e., neither answer nor report the call. In this manner, the user can allow the caller to leave a voice message such that the user can determine later whether the call was genuine, irrelevant (e.g., a sales speech left in the voice message), or spoofed based on the contents of the voice message or lack thereof. Additionally, the first screen 205 may include additional notifications to the user (e.g., in a third region, not shown) informing that the call may be genuine (or spoofed), along with a confidence metric estimated in making such determination, in some cases—e.g., when the mobile device 110 operates in the supervised mode of operation.

In some embodiments, the mobile device 110 may monitor how the user categorized the call based on the voice message—e.g., the user determined the call as spoofed based on the voice message stating "this is regarding your student federal loan" when the user has no student loan. Upon the user determining the call as spoofed and responding to the call (e.g., reporting the call as spoofed to a government authority and/or a service provider), the mobile device 110 may update its list of the spoofed phone numbers to include a phone number of the call and/or store the set of information included in the call that the user deemed as spoofed in the memory of the mobile device 110. Subsequently, the mobile device 110 may block additional calls from the phone number and/or based on the set of information included in the call—e.g., blocking additional calls having different phone numbers, but including the same information (e.g., a geographic location, a hardware device identifier, an IP address, or a combination thereof) regarding the source device (e.g., the source device 130) that generated the calls.

In some embodiments, when the user selects the first input region of the first screen 205—i.e., the user decides to answer the call, the mobile device 110 may add the phone number (e.g., the phone number displayed on the first screen 205) to a list of recent phone numbers received by the mobile device 110. The user, however, may find that the call was either a spoofed call or an illegitimate call (e.g., a sales or promotion call). Thereafter, the user may want to report the call to an authority and/or the service provider. The mobile device 110 may display the phone number on the screen after the user terminates the call, where the phone number is accompanied by a prompt for the user to indicate that the call was spoofed. Once the user indicates that the call as spoofed, the mobile device 110 may add the phone number to the list of spoofed phone numbers stored in the mobile device 110. Further, the mobile device 110 may store the set of information included in the call in a memory of the mobile device 110, which is configured to store multiple sets of information included in the spoofed calls.

Additionally or alternatively, as depicted in a second screen 210, the mobile device 110 may display the list of recent phone numbers including the phone number (that the user determined as spoofed) on the screen after the user terminates the call. The second screen 210 also depicts that individual phone numbers are associated with corresponding prompts (e.g., prompts 230a through 230c). Each prompt provides an option for the user to select to report the phone number and the set of information to the authority and/or the service provider.

A third screen 215 illustrates that the mobile device 110 may display a notification 240 on its screen to inform the user that the incoming call is a spoofed call. For example, the mobile device 110 can estimate a confidence metric while the mobile device 110 determines that the call is spoofed (or genuine) based on the set of information included in the call. Further, the mobile device 110 may determine that the confidence metric is greater than a threshold. In such cases, the mobile device 110 displays the notification 240 to inform the user that the incoming call is a spoofed call. Additionally or alternatively, the mobile device 110 may spontaneously block the incoming call from reaching the user. In some embodiments, the third screen 215 may include a phone number of the incoming call, as depicted in the first screen 205. In some cases, the third screen 215 illustrates the mobile device 110 operating under the unsupervised mode (e.g., the mobile device 110 operating without the user's input and/or responses), in conjunction with a neural network component that can be trained based on the user's past responses to potentially spoofed calls.

Figure 3:
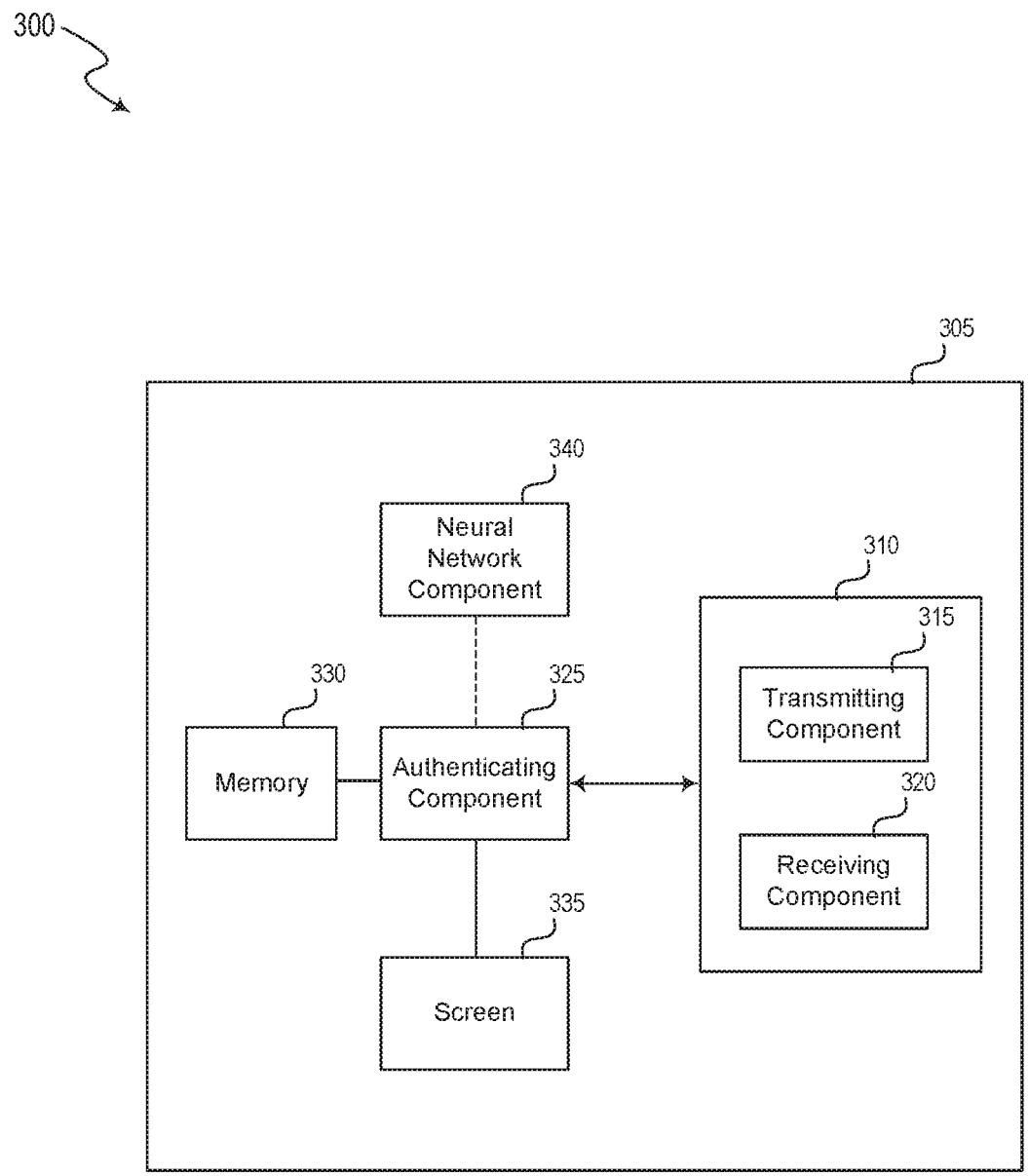
FIG. 3 is a block diagram of a mobile device that supports managing spoofed calls in accordance with embodiments of the present technology.

FIG. 3 is a block diagram 300 schematically illustrating a mobile device that supports managing spoofed calls in accordance with an embodiment of the present technology. The diagram 300 includes a mobile device 305, which may be an example of or include an aspect of the mobile device 110 described with reference to FIGS. 1 and 2. The mobile device 305 of the diagram 300 includes a wireless communication component 310 comprising a transmitting component 315 and a receiving component 320, an authenticating component 325, a memory 330, and a screen 335.

The receiving component 320 may be configured to receive a call transmitted over a cellular network (e.g., the cellular, wireless, or mobile network described with reference to FIG. 1, in which the mobile device 305 is coupled (e.g., linked) with the intermediary communication system 120 via the wireless communication link 115). The call may include a set of information associated with the cellular network—e.g., a geographic location, a hardware device identifier, and/or an IP address of a source device 130 that generated the call, or the like.

The authenticating component 325 may be configured to determine whether the call is spoofed or genuine based, at least in part, on the set of information included in the call. In some cases, the authenticating component 325 may compare the set of information with multiple sets of information included in the past spoofed calls, which the mobile device 305 has stored in the memory 330. Also, the mobile device 305 may store a list of spoofed phone numbers in the memory 330 and update the list (e.g., add to the list) when the mobile device 305 receives additional spoofed calls, which may be determined based on the user's input (e.g., when the user selects the second input region 225 to report the phone number as spoofed) or the mobile device 305's own determination (e.g., when the mobile device 305 operates under the unsupervised mode as described with reference to FIG. 2). In some embodiments, the authenticating component 325 may be configured to estimate a confidence metric while determining that the call is spoofed (or genuine) based on the set of information. In this regard, the mobile device 305 may include a neural network component 340 configured to improve the confidence interval based on inputs from the user accumulated over time.

Further, the mobile device 305 may display the spoofed phone numbers in the list to the user (e.g., on the screen 335) such that the user may examine the list to see if one or more phone numbers classified as spoofed are actually legitimate phone numbers that the user wants to receive calls therefrom. In some cases, the phone numbers that the user wants to reclassify (e.g., remove from the list of spoofed phone numbers) may include phone numbers of legitimate business entities associated with the user, e.g., the user's banks, particular stores that the user maintains business with. In some cases, valid contacts (and/or their phone numbers) in the user's contact list may have been abused (e.g., used to disguise or otherwise conceal true identities of callers that generated the spoofed calls), and as a result, have been classified as spoofed. Thus, the user may want to reclassify (e.g., remove from the list of spoofed phone numbers) such valid contacts (and/or their phone numbers) such that the user may continue to receive calls from such valid contacts. In some cases, individual phone numbers of the list may be displayed on the screen 335, along with corresponding prompts configured for the user to select to reclassify the individual phone numbers. Thereafter, the mobile device 305 may delete, from the list of spoofed phone numbers, such phone numbers that the user selected to reclassify.

Figure 4:
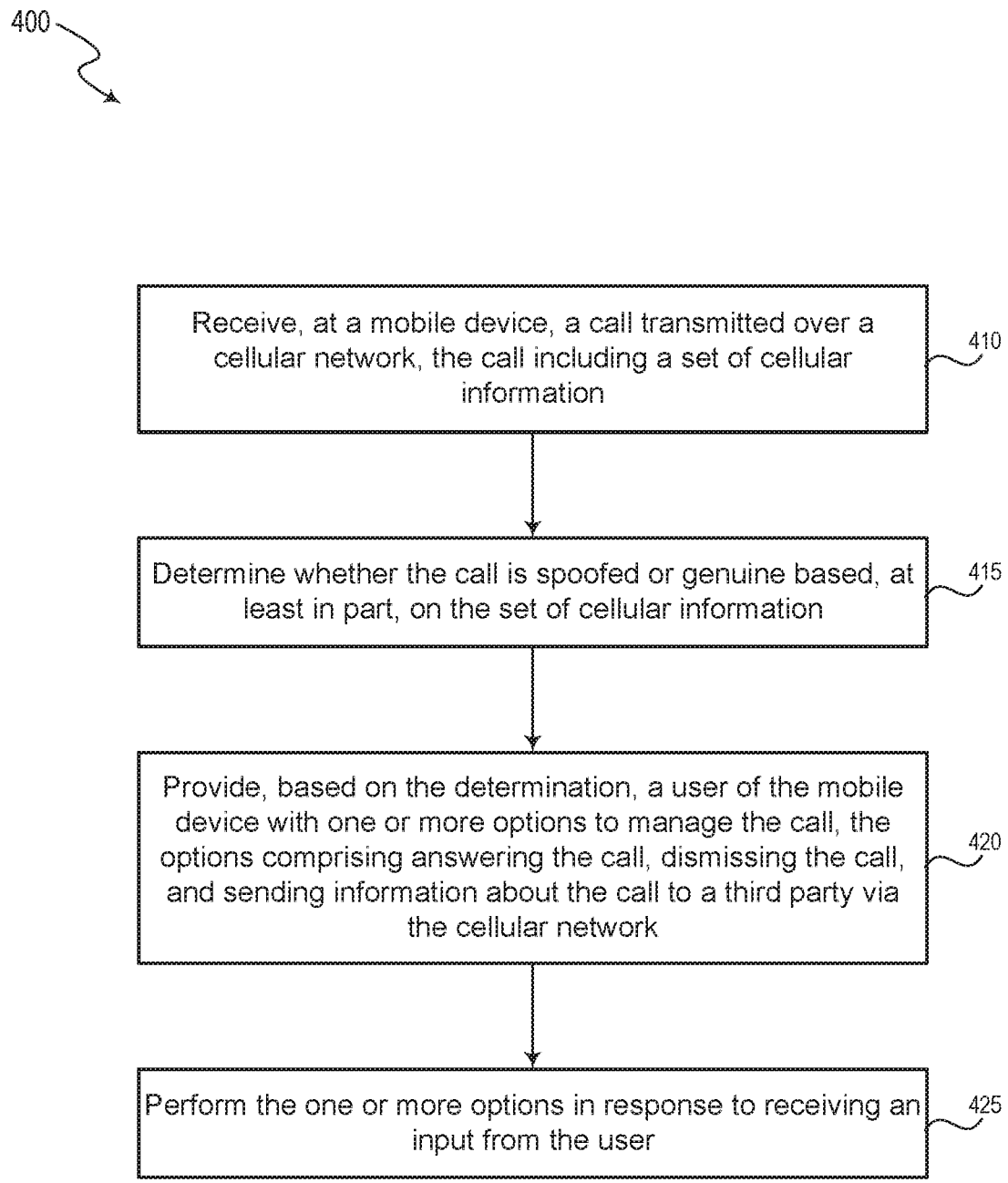
FIGS. 4 and 5 are flowcharts illustrating methods of managing spoofed calls to mobile devices in accordance with embodiments of the present technology.

FIG. 4 is a flowchart 400 illustrating a method of managing spoofed calls to mobile devices in accordance with embodiments of the present technology. The flowchart 400 may be an example of or include aspects of a method that a mobile device (e.g., the mobile device 110, the mobile device 305) may perform as described with reference to FIGS. 1 through 3.

The method includes receiving, at a mobile device, a call transmitted over a cellular network, the call including a set of cellular information (box 410). In accordance with one aspect of the present technology, the receiving feature of box 410 can be performed by a mobile device (e.g., the mobile device 110, the mobile device 305), in conjunction with the wireless communication component 310 in some cases, as described with reference to FIGS. 1 through 3.

The method further includes determining whether the call is spoofed or genuine based, at least in part, on the set of cellular information (box 415). In accordance with one aspect of the present technology, the determining feature of box 415 can be performed by a mobile device (e.g., the mobile device 110, the mobile device 305), in conjunction with the authenticating component 325 in some cases, as described with reference to FIGS. 1 through 3.

The method further includes providing, based on the determination, a user of the mobile device with one or more options to manage the call, the options comprising answering the call, dismissing the call, and sending information about the call to a third party via the cellular network (box 420). In accordance with one aspect of the present technology, the providing feature of box 420 can be performed by a mobile device (e.g., the mobile device 110, the mobile device 305), in conjunction with the screen 335 in some cases, as described with reference to FIGS. 1 through 3.

The method further includes performing the one or more options in response to receiving an input from the user (box 425). In accordance with one aspect of the present technology, the performing feature of box 425 can be performed by a mobile device (e.g., the mobile device 110, the mobile device 305) as described with reference to FIGS. 1 through 3.

In some embodiments, providing the user with the one or more options to manage the call includes displaying on a screen of the mobile device a phone number corresponding to the call, a first input region, and a second input region, where the first input region is configured to accept the input that corresponds to answering the call, and the second input region is configured to accept the input that corresponds to reporting the phone number and the set of cellular information to an authority, a service provider of the cellular network, or both. In some embodiments, performing the one or more options includes transmitting the phone number and the set of cellular information to the authority, the service provider, or both, when the user selects the second input region. In some embodiment, the method may further include adding the phone number to a list of spoofed phone numbers stored in the mobile device, after transmitting the phone number and the set of cellular information.

In some embodiments, the method may further include storing the set of cellular information to a memory of the mobile device configured to store multiple sets of cellular information associated with spoofed phone numbers, after transmitting the phone number and the set of cellular information. In some embodiments, the method may further include adding the phone number to a list of recent phone numbers received by the mobile device, when the user selects the first input region. In some embodiments, the method may further include displaying the list of recent phone numbers including the phone number on the screen after the user terminates the call, where at least the phone number is accompanied by a prompt configured for the user to select to report the phone number and the set of cellular information to the authority, the service provider, or both.

In some embodiments, the method may further include displaying the phone number on the screen after the user terminates the call, where the phone number is accompanied by a prompt for the user to indicate that the phone number was spoofed. In some embodiments, the method may further include storing the set of cellular information to a memory of the mobile device configured to store multiple sets of cellular information associated with the phone numbers determined to be spoofed. In some embodiments, the method may further include estimating a confidence metric while determining that the call is spoofed based on the set of cellular information, and displaying on the screen a third region including a notification to the user informing that the call is spoofed, when the confidence metric is greater than a threshold. In some embodiments, the method may further include estimating a confidence metric while determining that the call is spoofed based on the set of cellular information, and displaying on the screen a third region in addition to the first and second input regions, the third region including a notification to the user informing that the call may be genuine, when the confidence metric is less than a threshold.

In some embodiments, the set of cellular information may include a location determined by a global positioning system (GPS), which corresponds to a geographic location of a device that generated the call, and determining whether the call is spoofed or genuine includes determining that the location is within a distance from one or more locations associated with spoofed calls received prior to the call, the distance devised to identify the location corresponding to the one or more locations. In some embodiments, the set of cellular information includes a hardware device identifier corresponding to a device that generated the call and determining whether the call is spoofed or genuine includes determining that the hardware device identifier corresponds to one or more hardware device identifiers associated with spoofed calls received prior to the call. In some embodiments, the set of cellular information may include an internet protocol (IP) address associated with a device that generated the call, and determining whether the call is spoofed or genuine includes determining that the IP address includes a common segment with one or more IP addresses associated with spoofed calls received prior to the call, the common segment devised to identify the IP address corresponding to the one or more IP addresses.

Figure 5:
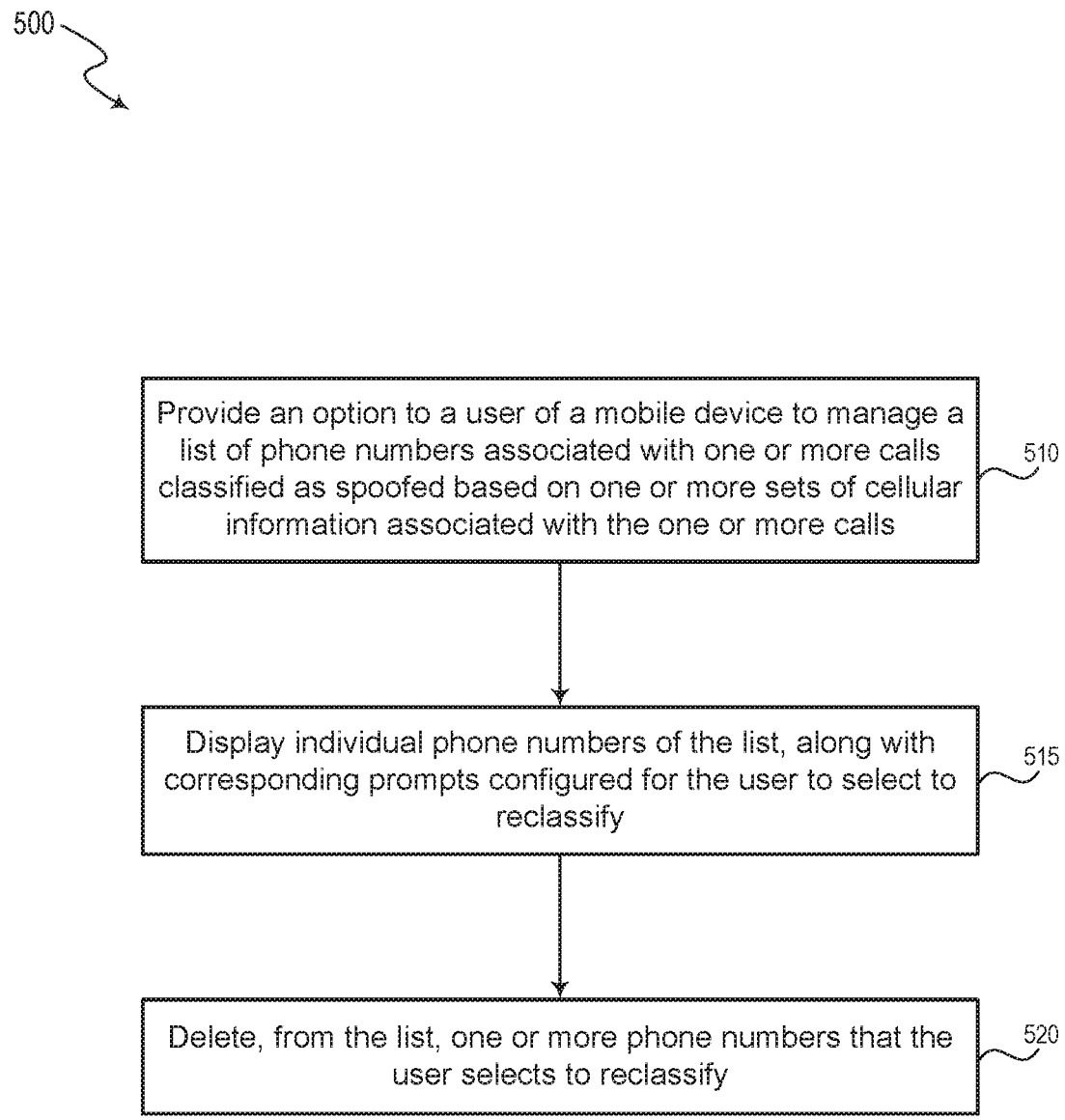

FIG. 5 is a flowchart 500 illustrating a method of managing spoofed calls to mobile devices in accordance with embodiments of the present technology. The flowchart 500 may be an example of or include aspects of a method that a mobile device (e.g., the mobile device 110, the mobile device 305) may perform as described with reference to FIGS. 1 through 3.

The method includes providing an option to a user of a mobile device to manage a list of phone numbers associated with one or more calls classified as spoofed based on one or more sets of cellular information associated with the one or more calls (box 510). In accordance with one aspect of the present technology, the providing feature of box 510 can be performed by a mobile device (e.g., the mobile device 110, the mobile device 305), in conjunction with the screen 335 in some cases, as described with reference to FIGS. 1 through 3.

The method further includes displaying individual phone numbers of the list, along with corresponding prompts configured for the user to select to reclassify (box 515). In accordance with one aspect of the present technology, the displaying feature of box 515 can be performed by a mobile device (e.g., the mobile device 110, the mobile device 305), in conjunction with the screen 335 in some cases, as described with reference to FIGS. 1 through 3.

The method further includes deleting, from the list, one or more phone numbers that the user selects to reclassify (box 520). In accordance with one aspect of the present technology, the deleting feature of box 520 can be performed by a mobile device (e.g., the mobile device 110, the mobile device 305), in conjunction with the memory 330 in some cases, as described with reference to FIGS. 1 through 3.

In some embodiments, the one or more phone numbers that the user selects to reclassify, may correspond to authentic phone numbers stored in the mobile device, which have been used to conceal identities of callers that generated the one or more calls classified as spoofed. In some embodiments, the one or more phone numbers that the user selects to reclassify, may be associated with legitimate business entities of the user.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
   receiving, at a mobile device, a call transmitted over a cellular network, the call including a set of cellular information having a location determined by a global positioning system (GPS) corresponding to a geographic location of a device that generated the call and an internet protocol (IP) address associated with the device;
   determining whether the call is spoofed or genuine based, at least in part, on the set of cellular information, wherein determining whether the call is spoofed or genuine includes (1) determining that the location is within a distance from one or more locations associated with spoofed calls received prior to the call, the distance devised to identify the location corresponding to the one or more locations and (2) determining that the IP address includes a common segment with one or more IP addresses associated with the spoofed calls, wherein the common segment includes a percentage of digits of the IP address for determining that the IP address corresponds to the one or more IP addresses, and wherein the percentage is determined based on past history of the cellular network generating the spoofed calls;
   providing, based on the determination, a user of the mobile device with one or more options to manage the call, the options comprising answering the call, dismissing the call, or sending information about the call to a third party via the cellular network; and
   performing the one or more options in response to receiving an input from the user.

2. The method of claim 1, wherein providing the user with the one or more options to manage the call comprises:
   displaying on a screen of the mobile device a phone number corresponding to the call, a first input region, and a second input region, wherein:
      the first input region is configured to accept the input that corresponds to answering the call, and
      the second input region is configured to accept the input that corresponds to reporting the phone number and the set of cellular information to an authority, a service provider of the cellular network, or both.

3. The method of claim 2, wherein performing the one or more options comprises:
   transmitting the phone number and the set of cellular information to the authority, the service provider, or both, when the user selects the second input region.

4. The method of claim 3, further comprising:
   adding the phone number to a list of spoofed phone numbers stored in the mobile device, after transmitting the phone number and the set of cellular information.

5. The method of claim 3, further comprising:
   storing the set of cellular information to a memory of the mobile device configured to store multiple sets of cellular information associated with spoofed phone numbers, after transmitting the phone number and the set of cellular information.

6. The method of claim 2, further comprising:
   adding the phone number to a list of recent phone numbers received by the mobile device, when the user selects the first input region.

7. The method of claim 6, further comprising:
   displaying the list of recent phone numbers including the phone number on the screen after the user terminates the call, wherein at least the phone number is accompanied by a prompt configured for the user to select to report the phone number and the set of cellular information to the authority, the service provider, or both.

8. The method of claim 6, further comprising:
   displaying the phone number on the screen after the user terminates the call, wherein the phone number is accompanied by a prompt for the user to indicate that the phone number was spoofed.

9. The method of claim 8, further comprising:
   storing the set of cellular information to a memory of the mobile device configured to store multiple sets of cellular information associated with the phone numbers determined to be spoofed.

10. The method of claim 2, further comprising:
    estimating a confidence metric while determining that the call is spoofed based on the set of cellular information; and
    displaying on the screen a third region including a notification to the user informing that the call is spoofed, when the confidence metric is greater than a threshold.

11. The method of claim 2, further comprising:
    estimating a confidence metric while determining that the call is spoofed based on the set of cellular information; and
    displaying on the screen a third region in addition to the first and second input regions, the third region including a notification to the user informing that the call may be genuine, when the confidence metric is less than a threshold.

12. The method of claim 1, wherein the set of cellular information includes a hardware device identifier corresponding to a device that generated the call, and determining whether the call is spoofed or genuine includes determining that the hardware device identifier corresponds to one or more hardware device identifiers associated with spoofed calls received prior to the call.

13. A mobile device, comprising:
    a receiving component configured to receive a call transmitted over a cellular network, the call including a set of cellular information having a location determined by a global positioning system (GPS) corresponding to a geographic location of a device that generated the call and an internet protocol (IP) address associated with the device;
    an authenticating component configured to determine whether the call is spoofed or genuine based, at least in part, on the set of cellular information, wherein determining whether the call is spoofed or genuine includes (1) determining that the location is within a distance from one or more locations associated with spoofed calls received prior to the call, the distance devised to identify the location corresponding to the one or more locations and (2) determining that the IP address includes a common segment with one or more IP addresses associated with the spoofed calls, wherein the common segment includes a percentage of digits of the IP address for determining that the IP address corresponds to the one or more IP addresses, and wherein the percentage is determined based on past history of the cellular network generating the spoofed calls;

a screen configured to provide a user of the mobile device with one or more options to manage the call, and to receive an input from the user; and a transmitting component configured to transmit, in response to receiving the input from the user, a phone number corresponding to the call and the set of cellular information to an authority, a service provider of the cellular network, or both.

14. The mobile device of claim 13, wherein the authenticating component is further configured to estimate a confidence metric while determining that the call is spoofed based on the set of cellular information.

15. The mobile device of claim 13, further comprising:

a neural network component configured to improve a confidence interval based on inputs from the user accumulated over time, wherein the confidence interval is estimated while determining that the call is spoofed based on the set of cellular information.

* * * * *